US005600765A

United States Patent [19]
Ando et al.

[11] Patent Number: 5,600,765
[45] Date of Patent: Feb. 4, 1997

[54] DISPLAY SYSTEM CAPABLE OF ACCEPTING USER COMMANDS BY USE OF VOICE AND GESTURE INPUTS

[75] Inventors: Haru Ando, Kokubunji; Yoshinori Kitahara, Musashimurayama, both of Japan

[73] Assignee: Hitachi, Ltd., Tokyo, Japan

[21] Appl. No.: 137,788

[22] Filed: Oct. 19, 1993

[30] Foreign Application Priority Data

Oct. 20, 1992 [JP] Japan .................................. 4-282057

[51] Int. Cl.[6] .................................................... G06T 11/00
[52] U.S. Cl. ........................... 395/133; 395/326; 395/806
[58] Field of Search ........................... 395/161, 155–161, 395/133, 700, 153, 154, 118

[56] References Cited

U.S. PATENT DOCUMENTS

| | | | |
|---|---|---|---|
| 4,811,243 | 3/1989 | Racine | 395/161 |
| 5,201,034 | 4/1993 | Matsuura et al. | 395/155 |

FOREIGN PATENT DOCUMENTS 4-239832  8/1992  Japan .

OTHER PUBLICATIONS

"Maclife", No. 25,9, Sep. 1990, Kawade Publishers, pp. 82–88, & 97–99.
"Put-That-There: Voice and Gesture at the Graphics Interface", R. Bolt, Computer Graphics, vol. 14, No. 3, 1980, pp. 262–270.
"Fundamentals of Voice Information Processing", Saito et al, The Ohm-sha, Ltd., 1981, pp. 95–104.
"Study on Colloquial Sentence Accepting Method in Information Retrieval System Based on Voice Inputs", Japan Institute of Acoustics, 3–5–7, Mar. 1991, Kitahara et al, pp. 101–102.
"Media Space for Systemization of Conceptual Knowledge", Computer Science, vol. 2, No. 1, 1991, Fujisawa, pp. 39–45.
"Personal Computing in the Year of 2010", Nikkei Byte, Jun. 1992, Takachiho et al, pp. 228–233.
"Simultaneous Language and Image Information Processing in a User–Interface Link Between Language and Image Taking Group Information into Consideration" 36th Information Processing Institute, Hataka et al, pp. 1371–1372.
"Study on Integration–Model F Information on Multi-Model Interface", Collection of Data for 8th Symposium on Human Interface, Oct. 1992, Ando et al, pp. 259–264.
W. Wahlster, "User and Discourse Models for Multimodal Communication", Intelligent User Interfaces, 1991, ACM Press, Chapter 3, pp. 45–67.

Primary Examiner—Almis R. Jankus
Attorney, Agent, or Firm—Fay, Sharpe, Beall, Fagan, Minnich & McKee

[57] ABSTRACT

A method of accepting multimedia operation commands wherein, while pointing to either of a display object or a display position on a display screen of a graphics display system through a pointing input device, a user commands the graphics display system to cause an event on a graphics display, through a voice input device; comprising a first step of allowing the user to perform the pointing gesture so as to enter a string of coordinate points which surround one area for either of the display object and any desired display position; a second step of allowing the user to give the voice command together with the pointing gesture; a third step of recognizing a command content of the voice command by a speech recognition process in response to the voice command; a fourth step of recognizing a command content of the pointing gesture in accordance with the recognized result of the third step; and a fifth step of executing the event on the graphics display in accordance with the command contents of the voice command and the pointing gesture. Thus, the method provides a man-machine interface which utilizes the plurality of media of the voice and the pointing gesture, which offers a high operability to the user, and with which an illustration etc. can be easily edited.

18 Claims, 19 Drawing Sheets

FIG. 3

| BIT-MAP NO. 301 | ILLUSTRATION PART NAME 302 | PIXEL DATA 303 | | | | | | | STD MAX LENGTH XD 304 | STD MAX WIDTH YD 305 |
|---|---|---|---|---|---|---|---|---|---|---|
| | | 1 | 2 | 3 | | 19998 | 19990 | 20000 | | |
| 1 | CAR | 0 | 0 | 0 | ... | 0 | 0 | 0 | 200 | 50 |
| 2 | BICYCLE | 0 | 0 | 0 | ... | 0 | 0 | 0 | 60 | 40 |
| 3 | BUS | 0 | 0 | 1 | ... | 0 | 0 | 0 | 150 | 70 |
| 4 | HOUSE | 0 | 0 | 1 | ... | 0 | 0 | 0 | 150 | 50 |
| 5 | BUILDING | 0 | 0 | 0 | ... | 0 | 0 | 0 | 100 | 150 |
| 6 | SCHOOL | 0 | 0 | 0 | ... | 0 | 0 | 0 | 70 | 250 |
| ⋮ | ⋮ | ⋮ | ⋮ | ⋮ | ⋮ | ⋮ | ⋮ | ⋮ | ⋮ | ⋮ |
| 12 | RECTANGLE | 0 | 0 | 0 | ... | 0 | 0 | 0 | 200 | 100 |
| ⋮ | ⋮ | ⋮ | ⋮ | ⋮ | ⋮ | ⋮ | ⋮ | ⋮ | ⋮ | ⋮ |
| 590 | FEMALE | 0 | 0 | 0 | ... | 0 | 0 | 0 | 20 | 70 |
| 591 | MALE | 0 | 0 | 0 | ... | 0 | 0 | 0 | 20 | 70 |
| 592 | GIRL | 0 | 0 | 0 | ... | 0 | 0 | 0 | 15 | 50 |
| 593 | BOY | 0 | 0 | 0 | ... | 0 | 0 | 0 | 15 | 50 |
| 594 | BABY | 0 | 0 | 0 | ... | 0 | 0 | 0 | 10 | 30 |
| 595 | OLD WOMAN | 0 | 0 | 1 | ... | 0 | 0 | 0 | 20 | 70 |
| 596 | OLD MAN | 0 | 0 | 1 | ... | 0 | 0 | 0 | 20 | 70 |
| 597 | HOSPITAL | 0 | 0 | 0 | ... | 0 | 0 | 0 | 250 | 70 |
| 598 | FACTORY | 0 | 0 | 0 | ... | 0 | 0 | 0 | 100 | 200 |
| 599 | CHURCH | 0 | 0 | 0 | ... | 0 | 0 | 0 | 200 | 100 |
| 600 | TEMPLE | 0 | 0 | 0 | ... | 0 | 0 | 0 | 200 | 40 |

| PART NO. | BIT-MAP NO. | WIDTHWISE SCALE-UP/ DOWN RATIO | LENGTHWISE SCALE-UP/ DOWN RATIO | CENTRAL X COORDINATE | CENTRAL Y COORDINATE |
|---|---|---|---|---|---|
| 1 | 1 | 1.0 | 1.0 | 350 | 330 |
| 2 | 12 | 1.0 | 1.0 | 300 | 80 |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
| ⋮ | ⋮ | ⋮ | ⋮ | ⋮ | ⋮ |

| COORDINATE NO. | t | x | y |
|---|---|---|---|
| 1 | 0 | 550 | 450 |
| 2 | 100 | 550 | 450 |
| 3 | 200 | 550 | 450 |
| 4 | 300 | 548 | 450 |
| 5 | 1300 | 550 | 447 |
| 6 | 1400 | 544 | 462 |
| 7 | 1500 | 540 | 463 |
| ⋮ | ⋮ | ⋮ | ⋮ |

| PART NO. | BIT-MAP NO. | WIDTHWISE SCALE-UP/ DOWN RATIO | LENGTHWISE SCALE-UP/ DOWN RATIO | CENTRAL X COORDINATE | CENTRAL Y COORDINATE |
|---|---|---|---|---|---|
| 1 | 1 | 2.0 | 2.0 | 350 | 330 |
| 2 | 12 | 1.0 | 1.0 | 300 | 80 |
| | | | | | |
| | | | | | |
| | | | | | |
| | | | | | |
| | | | | | |
| | | | | | |
| | | | | | |
| ⋮ | ⋮ | ⋮ | ⋮ | ⋮ | ⋮ |

4000

DRAW A BUILDING ABOUT THIS SIZE

FIG. 13

| BIT-MAP NO. | STD PART NAME | PART NAMES |
|---|---|---|
| 1 | CAR | MOTORCAR, AUTOMOBILE, FOUR-WHEELED VEHICLE |
| 2 | BICYCLE | BIKE, TWO-WHEELED VEHICLE |
| 3 | BUS | |
| 4 | HOUSE | HOME |
| 5 | BUILDING | |
| ⋮ | ⋮ | ⋮ |
| 12 | RECTANGLE | OBLONG, TETRAGON |
| ⋮ | ⋮ | ⋮ |
| 597 | HOSPITAL | CLINIC |
| 598 | FACTORY | PLANT, WORKSHOP |
| ⋮ | ⋮ | ⋮ |

| PART NO. | BIT-MAP NO. | WIDTHWISE SCALE-UP/ DOWN RATIO | LENGTHWISE SCALE-UP/ DOWN RATIO | CENTRAL X COORDINATE | CENTRAL Y COORDINATE |
|---|---|---|---|---|---|
| 1 | 1 | 2.0 | 2.2 | 500 | 170 |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
| ⋮ | ⋮ | ⋮ | ⋮ | ⋮ | ⋮ |

4000

| PART NO. | BIT-MAP NO. | WIDTHWISE SCALE-UP/ DOWN RATIO | LENGTHWISE SCALE-UP/ DOWN RATIO | CENTRAL X COORDINATE | CENTRAL Y COORDINATE |
|---|---|---|---|---|---|
| 1 | 1 | 1.0 | 1.0 | 570 | 250 |
| 2 | 12 | 1.0 | 1.0 | 300 | 80 |
| | | | | | |
| | | | | | |
| | | | | | |
| | | | | | |
| | | | | | |
| | | | | | |
| ⋮ | ⋮ | ⋮ | ⋮ | ⋮ | ⋮ |

4000

| | 191 | 192 | 193 | 194 | 195 |
|---|---|---|---|---|---|
| | VERB | COMMAND | COMMAND NO. | WORD ATTRIBUTE | WORD ATTRIBUTE NO. |
| 1191 | ENLARGE | SCALE-UP /DOWN | 1~1941 | OBJECT NAME | 11 |
| | | | | SIZE | 12 |
| 1192 | MOVE | MOVEMENT | 2~1942 | OBJECT NAME | 21 |
| | | | | POSITION | 22 |
| 1193 | DRAW | NEW INPUT | 3~1943 | OBJECT NAME | 31 |
| | | | | POSITION | 32 |
| | ⋮ | ⋮ | ⋮ | ⋮ | ⋮ |

DISPLAY SYSTEM CAPABLE OF ACCEPTING USER COMMANDS BY USE OF VOICE AND GESTURE INPUTS

BACKGROUND OF THE INVENTION

The present invention relates to a user interface method for an illustration edit system etc. which is installed in OA (office automation) products such as a personal computer, a workstation or a word processor. It provides a method of commanding a display system to cause events on a graphics display by the use of information of media convenient to a user.

In, for example, a graphics edit system, when newly entering a pattern anew, the following procedured steps have heretofore been required as stated in "MACLIFE" (No. 25, 9, published by Kawade Publishers): First, the pattern to be entered is selected from within a graphics pattern menu displayed on a display screen beforehand, by the use of a pointing device such as mouse. Subsequently, using the pointing device, the contour line of the selected pattern is pointed to, and the pattern is dragged to determine its input position. Further, in the case of determining the size of the pattern, the contour line of the pattern is dragged with the pointing device so as to adjust the size thereof.

A pattern can be designated by the vocalization of a demonstrative pronoun with an attendant gesture, as disclosed in B. A. Bolt: "Put that there." (Computer Graphics, 14, 3, 1980). Another method of designating a pattern is giving a name to an object drawn on a display screen, before the start of a graphics edit mode, and using the name for a voice command thenceforth.

By the way, the assignee of the present application has previously filed Japanese Patent Application No. Hei4-239832 (1992) as to improvements in a method wherein a voice command with an attendant gesture is issued in order to handle a subject displayed on a display screen. The patent application discloses a technique in which, among command content candidates obtained through the recognition process of the voice command, specified candidates are excluded from the subject to-be-recognized in accordance with the number of pointing gestures attendant upon the voice command.

As stated above, with the prior art, when the pattern is to be newly entered in the graphics edit mode, any of standard patterns is first selected to display the desired pattern on the screen. Thereafter, the size of the pattern needs to be designated. That is, the size cannot be designated simultaneously with the input of the pattern.

Moreover, the pattern already entered cannot have its size designated by the gesture.

Furthermore, in a case where the user wishes for a specified illustration, he/she must draw the illustration through, e.g., the combination of basic patterns by himself/herself. It is also troublesome that the naming job is required for designating the drawn object by only the voice input.

SUMMARY OF THE INVENTION

An object of the present invention is to provide a method of and system for accepting multimedia operation commands, which utilize a plurality of media such as a voice and a pointing gesture, which offer a high operability to a user, and with which an illustration etc. can be easily entered and edited.

In one aspect of performance of the present invention, there is provided a method of accepting multimedia operation commands wherein, while pointing to either of a display object or a display position on a display screen of a graphics display system through a pointing input device, a user commands the graphics display system to cause an event on a graphics display, through a voice input device; comprising:

the first step of allowing the user to perform the pointing gesture so as to enter a string of coordinate points which surround one area for either of the display object or any desired display position;

the second step of allowing the user to give the voice command together with the pointing gesture;

the third step of recognizing a command content of the voice command by a speech recognition process in response to the voice command;

the fourth step of recognizing a command content of the pointing gesture in accordance with the recognized result of the third step; and the fifth step of executing the event on the graphics display in accordance with the command contents of the voice command and the pointing gesture.

In another aspect of performance of the present invention, there is provided a display system which is commanded by a user to cause an event concerning a display object on a graphics display, by the use of a voice and a pointing gesture; comprising:

a pointing input device for entering a string of coordinate points which surround one area for either of the display object on the graphics display or a display position of the display object;

a pointing area table which stores therein the string of coordinate points entered by the pointing input device;

a bit map data memory for storing therein bit map data of various display parts that constitute the display object, and standard maximum widths and standard maximum lengths of the display parts;

a drawing table which stores therein identifiers of the display parts selected from within the bit map data memory and displayed on the graphics display, widthwise and lengthwise scale-up/down ratios of the display parts relative to the standard maximum widths and lengths on the graphics display, and positional information of the display parts;

a display parts dictionary which holds therein speech-recognizable names of the individual display parts stored in the bit map data memory;

a voice command input device for entering the voice command of the user;

a speech recognition device for recognizing the voice command entered by the voice command input device, with reference to the display parts dictionary;

a display parts extraction device for extracting the display parts on the graphics display as designated on the basis of the string of coordinate points in the pointing area table;

a target point calculator for calculating a target point designated on the basis of the string of coordinate points in the pointing area table;

a scale-up/down ratio calculator for calculating the widthwise and lengthwise scale-up/down ratio information of the display parts on the basis of the string of coordinate points in the pointing area table; and a controller for selectively activating at least one of the display parts extraction device, the target point calculator and the scale-up/down ratio calculator in accordance with a result of the speech recognition, and for rewriting the drawing table on the basis of a result of the activation.

According to the multimedia operation command accepting method and system of the present invention, the user designates the display object or the display position to-be-entered or edited through the voice input, and he/she simultaneously designates the display object, the input position thereof, the size thereof or the target position thereof through the pointing gesture, whereby the user is permitted to display the subject to-be-handled at the designated position on the display screen or with the designated size. By way of example, when the display object is to be scaled up or down (enlarged or reduced in size), the pointing gesture of the desired size may be performed on the display screen together with the voice command. Besides, when the new input is to be entered, the input subject to-be-handled is vocally designated, and the pointing gesture of the desired size is also performed at the desired position, whereby the size can be designated simultaneously with the entry of the subject. Thus, the operating steps are simplified, and the operability is enhanced.

Moreover, owing to the part illustrations dictionary which stores therein the necessary parts for drawing the illustration, and to the function by which the designated part is displayed on the display screen when the part name is given by the voice input, the user is freed from the necessity to draw the part to-be-displayed through, e.g., the combination of basic symbols by himself/herself, and he/she is permitted to display the part on the display screen with ease.

Also, a section of the part displayed on the display screen can be designated by the use of voice and gesture inputs. For example, a window of a car displayed on the screen can be designated by using a voice "window" together with a gesture pointing to the window to be designated, such that an event such as deleting, copy, etc. is performed.

The pointing gestures become more versatile and realize more natural inputs by calculating the difference value between the input times of the respectively adjoining individual coordinate points which constitute the entered strings of coordinate points is calculated, thereby sensing the termination of one pointing gesture, and judging the functions of the sensed individual gestures in accordance with the command contents of the voice inputs and the sequence of the information inputs.

The pointing gestures become still more versatile and realize still more natural inputs by recognizing an object designated by the user such that, in the case where the entered string of coordinate points indicate the display object and where the area formed by the string of coordinate points share the common areas on the display screen with the areas formed by the displayed objects, the displayed object which has the largest common area with the area formed by the string of coordinate points is determined as the designated subject to-be-handled, and in the case where the area formed by the string of coordinate points does not have the common areas on the display screen with the areas formed by the displayed objects, by determining the displayed object which has the central point nearest the coordinate point indicated by the mean value of the maximum and minimum X values of the individual coordinate points of the entered string and the mean value of the maximum and minimum Y values thereof as the designated subject to-be-handled.

The user is permitted to designate the size of the display object or the like quickly and easily, in the case where the scale-up or down (enlargement or reduction) of the display object or the size of the new input object is designated, by calculating the ratio $\alpha$ between the difference value of the minimum and maximum values in the X coordinate values of the information of the entered string of coordinate points and the standard maximum length of the display object, and the ratio $\beta$ between the difference value of the minimum and maximum values in the Y coordinate values and the standard maximum width of the display object, whereupon the calculated ratios $\alpha$ and $\beta$ are used for interpolating the cells of the bit map so as to enlarge the size of the picture or for thinning out the cells so as to reduce the size of the picture.

BRIEF DESCRIPTION OF THE DRAWINGS

FIG. 3 is a diagram showing an example of the data structure of bit map data (18);

FIG. 8 is a diagram showing an example of the data structure of a pointing area table;

FIG. 13 is a diagram showing an example of the data structure of a part illustrations dictionary (17);

PREFERRED EMBODIMENTS OF THE INVENTION

Now, the embodiments of the present invention will be described in detail with reference to the accompanying drawings.

Figure 1:
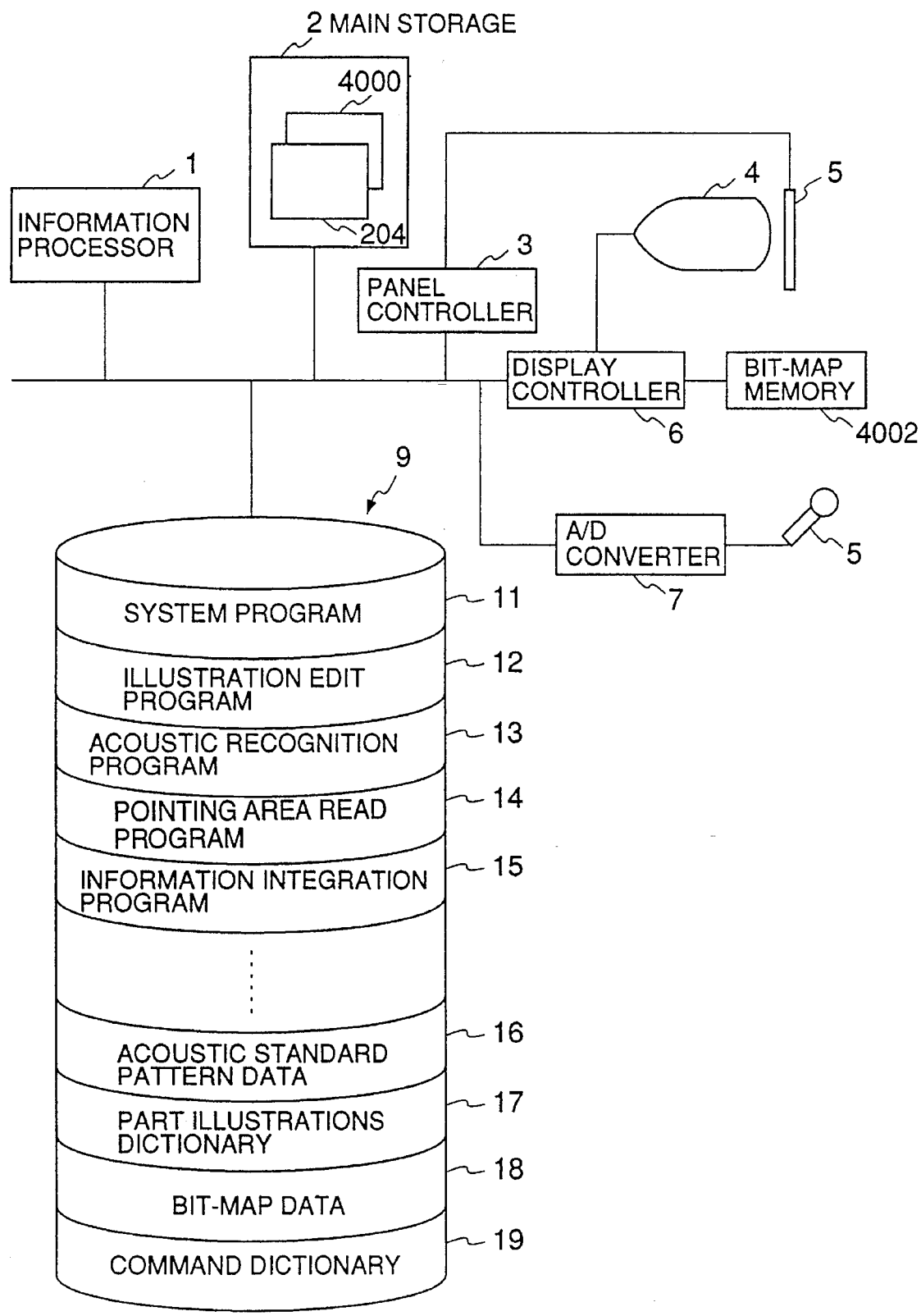
FIG. 1 is a system block diagram of a WS (workstation) showing an embodiment of the present invention.

FIG. 1 shows the architecture of a system which realizes a multimedia information entering method according to the present invention. Here in the description, an illustration edit system is taken as an example.

The system shown in FIG. 1 includes an information processor 1, main storage 2, a panel controller 3, a display device 4, a touch panel 5, a display controller 6, an A/D (analog-to-digital) converter 7, a microphone 8, a disk 9 and a bit map memory 4002. The disk 9 stores therein a system program 11, an illustration edit program 12, an acoustic recognition program 13, a pointing area read program 14, an information integration program 15, acoustic standard pattern data 16, a part illustrations dictionary 17, bit map data 18 and a command dictionary 19. The stored contents 11–19 of the disk 9 are loaded in the main storage 2 when the system is started up. Besides, the main storage 2 stores therein tables 204 and 4000 which will be explained later. A buffer area W to be explained later is also secured in the main storage 2. Display data in pixel units corresponding to the screen of the display device 4 are stored in the bit map memory 4002.

Figure 7:
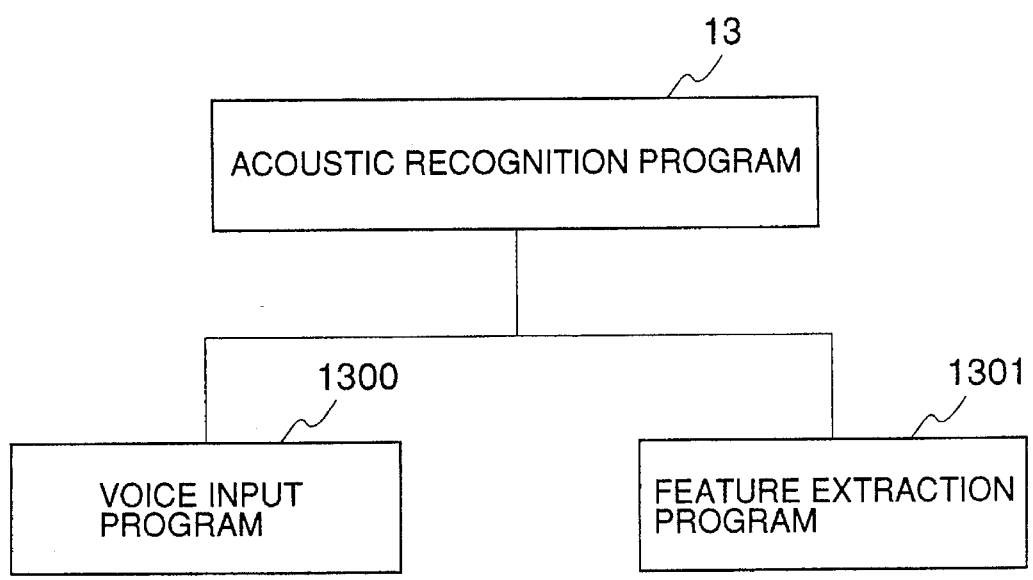
FIG. 7 is a module block diagram showing an example of an acoustic recognition program (13)

As shown in FIG. 7, the acoustic recognition program 13 is configured of a voice input program 1300 and a feature extraction program 1301.

Figures 9, 10:
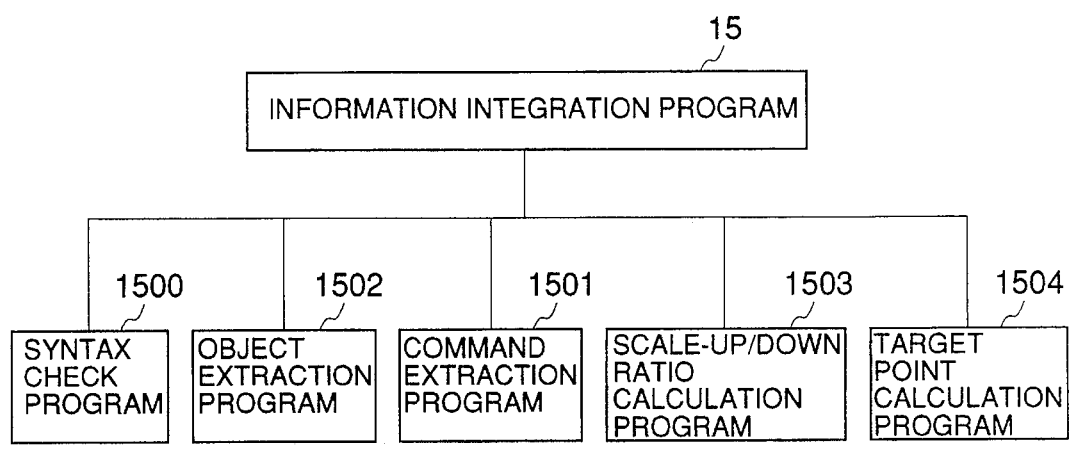
FIG. 9 is a diagram showing an example of an information integration program (15)
FIG. 10 is a diagram showing an example of a drawing table which has been rewritten by the designation of the subject scale-up.

As shown in FIG. 9, the information integration program 15 is configured of the modules of a syntax check program 1500, an object extraction program 1501, a command extraction program 1502, a scale-up/down ratio calculation program 1503 and a target point position calculation program 1504.

Figure 2:
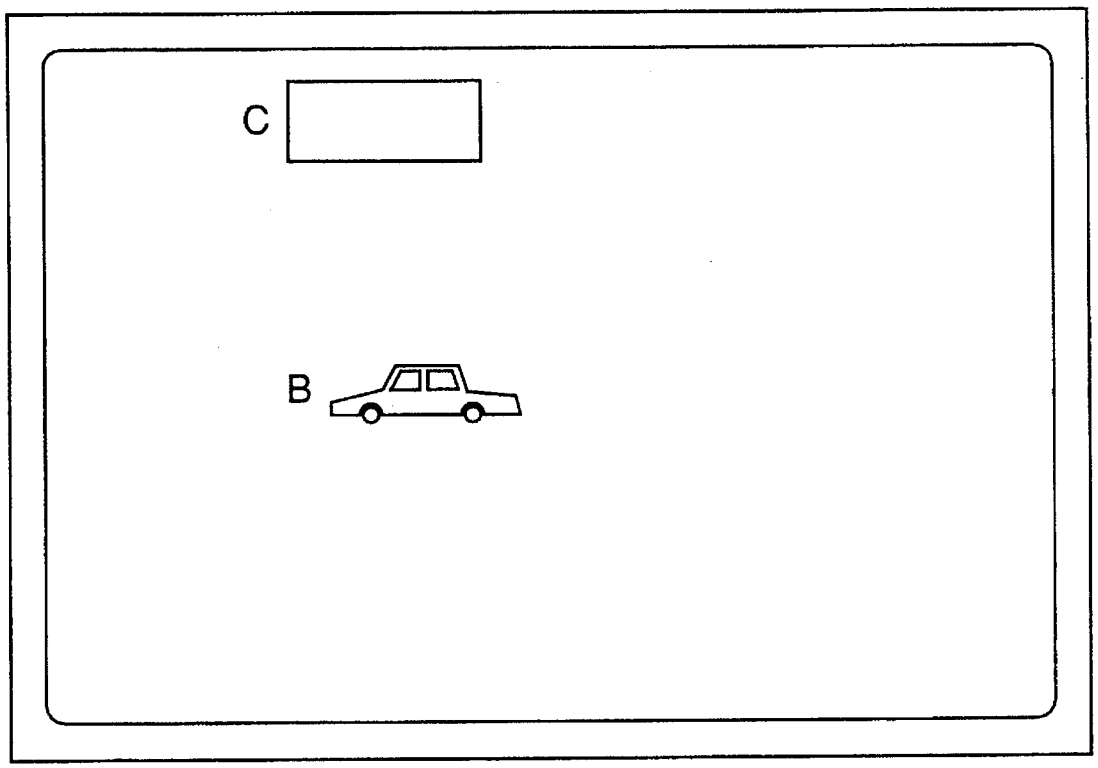
FIG. 2 is a view showing an example of an illustration editing picture frame.

FIG. 2 shows an example of an illustration editing picture frame which is displayed on the display device 4 through the illustration edit program 12 loaded in the main storage 2. In the figure, a car B and a rectangle C are drawn in a graphics mode on the basis of the drawing table (4000 in FIG. 4) stored in the main storage 2, by the illustration edit program 12.

Referring to FIG. 3, the bit map data 18 of the standard symbols of part illustrations such as the "car B" and "rect-angle C" are prepared for the respective part illustrations. In the figure, numeral 301 denotes the identification No. of the bit map of the standard symbol of each part illustration, numeral 302 the name of the corresponding illustration part, and numeral 303 the data Nos. of the individual pixel data of the corresponding part illustration. In addition, numeral 304 represents the difference value between the minimum and maximum X-axial values among the nonzero coordinate values of the pixel data in the case where the bit map data 18 of the corresponding part illustration are expanded on the illustration edit picture frame (the bit map memory 4002) under the condition that pixel No. 1, namely bit No. 1, is expanded at a position (0, 0) on the picture frame. The difference value 304 shall be termed the "standard maximum length XD". Likewise, numeral 305 represents the difference value between the minimum and maximum Y-axial values among the nonzero coordinate values of the pixel data in the case where the bit map data 18 of the corresponding part illustration are expanded on the illustration edit picture frame under the condition that pixel No. 1, namely bit No. 1, is expanded at the position (0, 0) on the picture frame. The difference value 305 shall be termed the "standard maximum width YD". In the case of the part illustration "car" of bit map No. 1, the standard maximum length XD is expressed as "200", and the standard maximum width YD as "50".

Figures 4, 5:
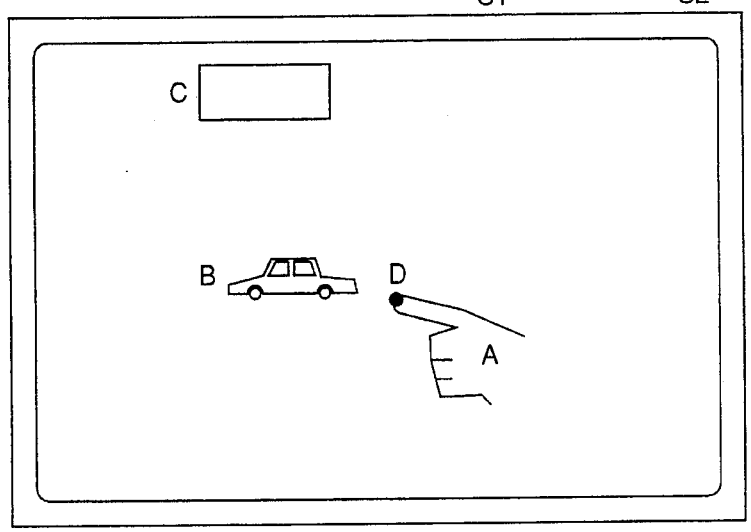
FIG. 4 is a diagram showing an example of the data structure of a drawing table.
FIG. 5 is a view showing an embodiment in which a subject to-be-handled is designated by a voice and a pointing gesture on an illustration editing picture frame.

The drawing table 4000 shown in FIG. 4 corresponds to the example of FIG. 2. Regarding the part illustration "car B" the standard bit map No. "1" indicated in FIG. 3, a widthwise scale-up/down ratio "1.0", a lengthwise scale-up/down ratio "1.0" and central coordinates "(350, 330)" are stored in the row for part No. 1. On the other hand, regarding the part illustration "rectangle C", standard bit map No. "12" indicated in FIG. 3, a widthwise scale-up/down ratio "1.0", a lengthwise scale-up/down ratio "1.0" and central coordinates "(300, 80)" are stored in the row for part No. 2. The maximum value of part Nos. (the largest part illustration number) is stored in the buffer area W (not shown) of the main storage 2. The central coordinates of each part illustration are indicated by the mean value of the minimum and maximum values on the X-axis of the illustration editing picture frame and that of the minimum and maximum values on the Y-axis thereof.

Figure 6:
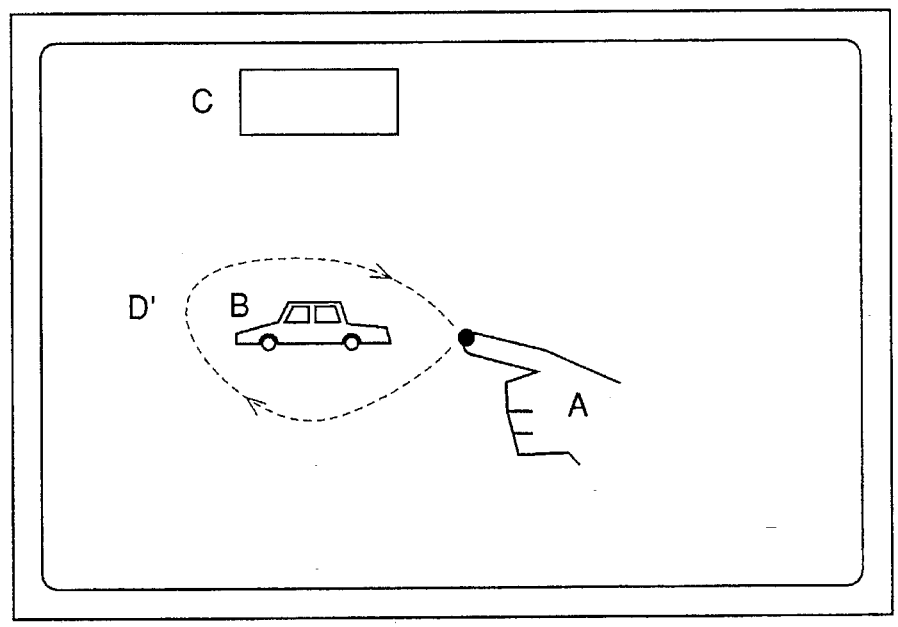
FIG. 6 is a view showing an embodiment in which the scale-up (enlargement) of a subject to-be-handled is designated by a voice and a pointing gesture on an illustration editing picture frame.
Figure 20:
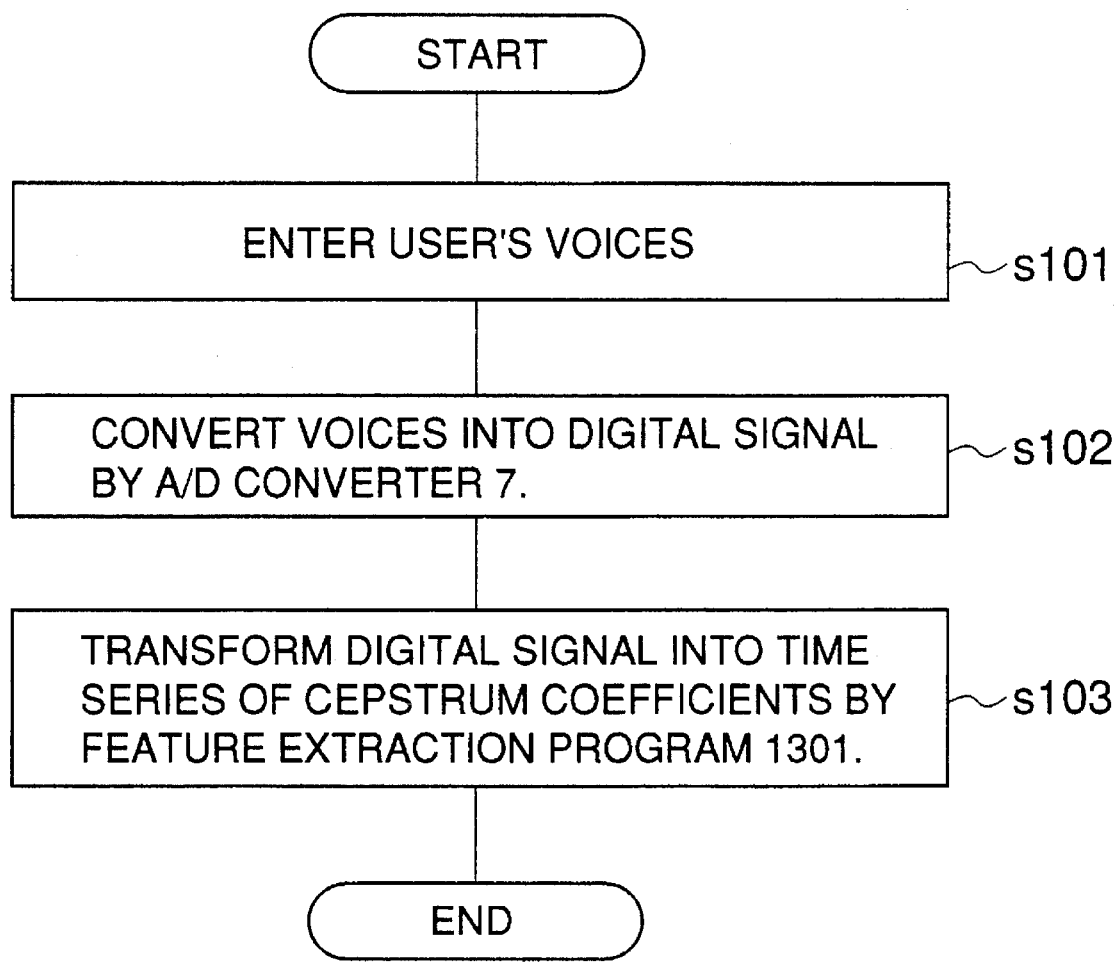
FIG. 20 is a flow chart exemplifying the flow of processing after the start of the acoustic recognition program (13)

It is assumed here that, as shown in FIGS. 5 and 6, the user of the system enters the intention of scaling up (enlarging) the part "car B" through voices and gestures. First, when the illustration edit program 12 is executed in the information processor 1, the acoustic recognition program 13 loaded in the main storage 2 is started. An example of the flow of the consequent processing is shown in FIG. 20. Once the acoustic recognition program 13 has been started, the voice input program 1300 is also started. On this occasion, as shown in FIG. 5 by way of example, the user points to a point D on the touch panel 5 with a finger tip A, a pen or the like, thereby designating the subject to-be-handled. Subsequently, as shown in FIG. 6, the user draws a curve D', thereby designating a size. While performing the gestures shown in FIGS. 5 and 6, the user enters the voice command "ENLARGE THIS ABOUT THIS SIZE" ("SCALE UP THIS TO ABOUT THIS SIZE" or "SCALE UP THIS ABOUT THIS MUCH"), more concretely, the voice command S1 in the state of FIG. 5 and the voice command S2 in the state of FIG. 6 are input by means of the microphone 8 substantially simultaneously with the gestures (step S101 in FIG. 20). The voice inputs S1 and S2 are applied to the A/D converter 7 by the voice input program 1300 and are then converted into a digital signal, which is sent to the main storage 2 (S102). Subsequently, the feature extraction program 1301 is started, and the digital signal is transformed into a time series of LPC cepstrum coefficients as a feature vector at a frame cycle of 10 [msec.] (S103). The time series of LPC cepstrum coefficients is stated in, for example, Saitoh and Nakata: "Fundamentals of Voice Information Processing" (1981, The Ohm-Sha, Ltd.). Here, the frame cycle is not restricted to 10 [msec.], but it can be set at any desired time period such as 20 [msec.] or 30 [msec.]. Also, the feature vector is not restricted to the LPC cepstrum coefficients, but it can be replaced with, e.g., the output of a band-pass filter.

Figure 21:
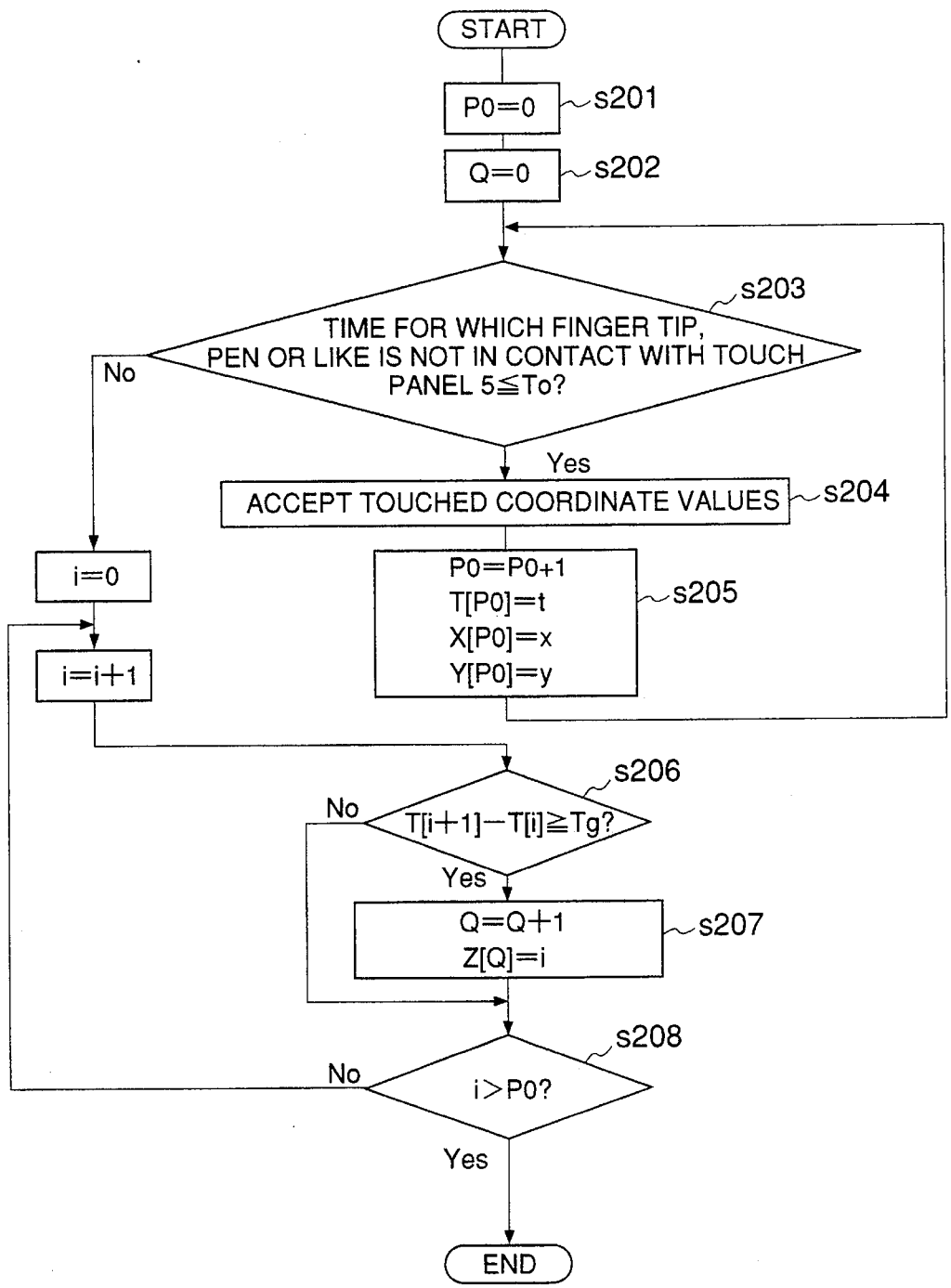
FIG. 21 is a flow chart exemplifying the flow of processing after the start of a pointing area read program (14)

Meanwhile, the pointing area read program 14 loaded in the main storage 2 is started by the information processor 1 at the same time that the acoustic recognition program 13 is started by the above method. Thus, the processing of the program 14 proceeds concurrently. An example of the flow of this processing is shown in FIG. 21. The pointing area table 204 which is utilized in the processing of FIG. 21, is shown in FIG. 8. This table 204 is made up of the columns of coordinate No. indicated at numeral 200, an input time 201, an x-coordinate 202 and a y-coordinate 203. Thus, the x-coordinate and y-coordinate data and the input times thereof are stored in this table 204 from coordinate No. 1 in the order in which the data are entered, successively at fixed time intervals. In the example mentioned here, the coordinate data are stored at the time intervals of 100 [msec.]. A time interval of 1000 [msec.] is involved between coordinate No. 4 and coordinate No. 5, and it is recognized as corresponding to the boundary between the first and second pointing gestures.

In the processing of FIG. 21, variables P0 and Q which are set in the buffer area W of the main storage 2 are first reset to zeros (steps S201 and S202), respectively. While the user is in touch with the touch panel 5 with, e.g., the finger tip or the pen (S203), the pointing area read program 14 accepts touched coordinates through the panel controller 3 at fixed time intervals which are very short (S204). The program 14 increments the variable P0 each time it accepts the coordinates (S205). Further, the program 14 writes the accepted x-coordinate into an array X[P0] in the pointing area table 204 (FIG. 8) of the main storage 2, the accepted y-coordinate into an array Y[P0], and the input time of the coordinates into an array T[P0] (S205). When a certain predetermined time period $T_o$ has lapsed since the release of the finger tip, the pen or the like from the touch panel 5, the program 14 terminates the writing operation (S203). The predetermined time period To is set at a duration long enough to recognize the boundary between individual operation commands such as scale-up/down, movement, new entry and copy. After the termination of the above writing operation, in order to determine the number of pointing gestures, the program 14 checks if the difference value $(T_{[i+1]}-T_{[i]})$ of the input times of the adjoining individual coordinate Nos., for example, coordinate No. i and coordinate No. (i+1) stored in the pointing area table 204 is equal to or greater than a certain predetermined value $T_g$ (S206). When this condition is encountered anywhere, the program 14 increments the variable Q and writes the coordinate No. i into an array Z in the main storage 2 (in the form of Z [Q]=i) (S207). Such steps are iterated until the value i becomes greater than the value P0 (S208). The predetermined value $T_g$ is a time interval which is long enough to recognize the boundary between gestures in a single operation command, and which is shorter than the time period $T_o$. The array Z(Q) corresponds to the last one of a series of coordinate Nos. as has been created by the Qth gesture. This array Z(Q) is utilized at a step S501 in FIG. 24 which will be referred to later.

Figure 22:
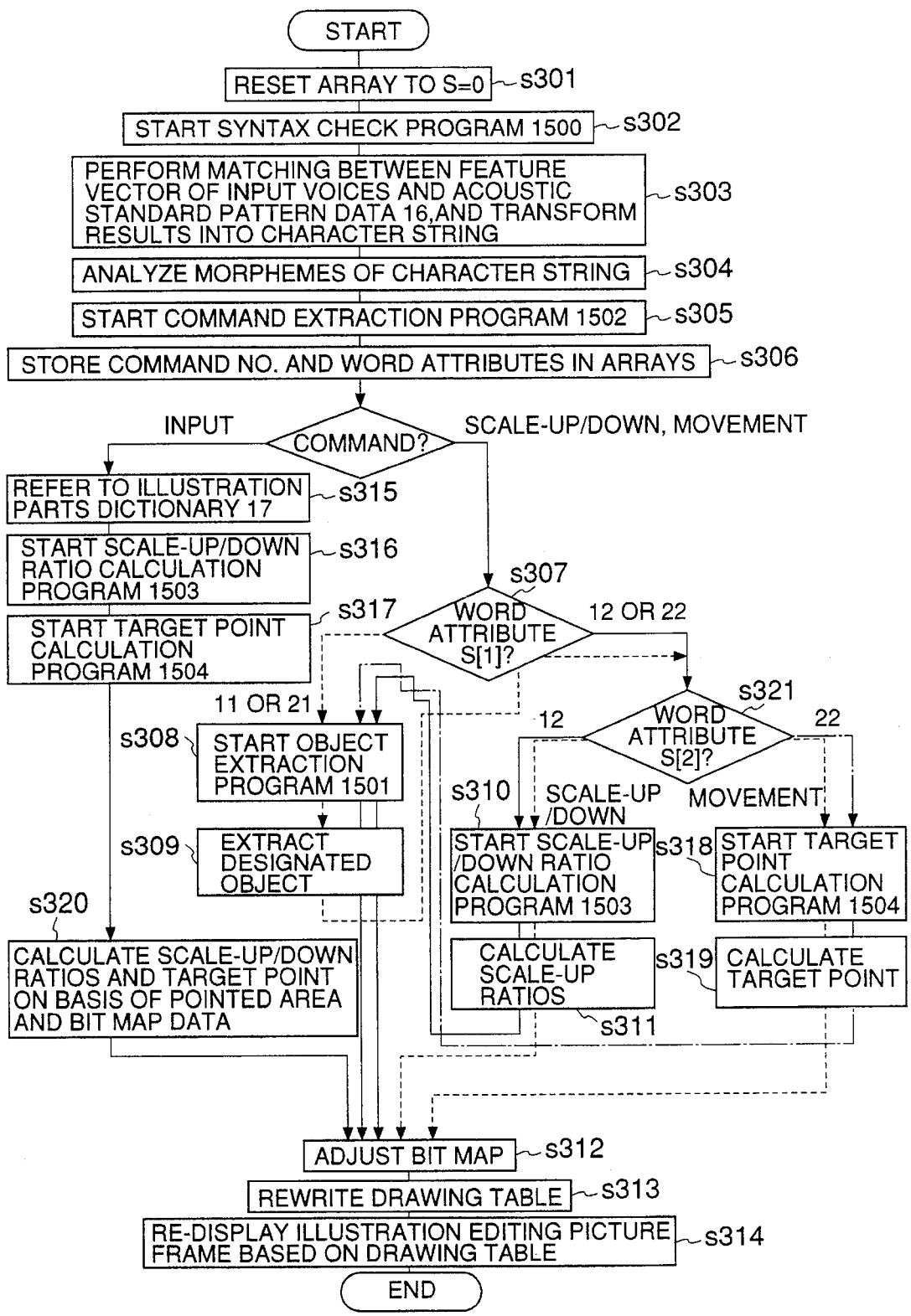
FIG. 22 is a flow chart showing an example of the flow of processing after the start of the information integration program (15)

When the user's pointing and vocalization have ended, the information integration program 15 loaded in the main storage 2 is started. FIG. 22 shows an example of the flow of processing after the start of the information integration program 15.

Figures 18, 19:
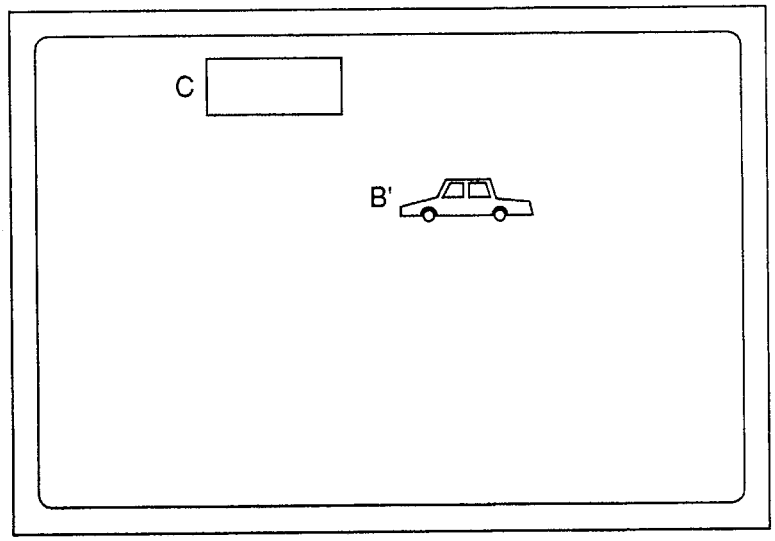
FIG. 18 is a view showing an example of an illustration editing picture frame which has been re-displayed by the designation of the subject movement.
FIG. 19 is a diagram showing an example of the data structure of a command dictionary (19)

Before the description of the processing in FIG. 22, an example of the data structure of the command dictionary 19 which is utilized in this processing will be explained with reference to FIG. 19. The command dictionary 19 is configured of the columns of a verb 191, a command 192 signified by the corresponding verb, command No. indicated at numeral 193, word attributes 194, and word attribute No. indicated at numeral 195. The verb may include "ENLARGE", "MOVE", "DRAW", "SCALE", "REDUCE", etc., although not all shown in FIG. 19. The word attributes 194 include "Object name" which indicates a display object, "Size" which indicates the size of the display object in a scale-up/down operation, and "Position" which indicates the position of the display object, etc. The items of the "Object name" are demonstrative pronouns such as "THIS" and "THAT", and other words contained in the illustration parts dictionary 17. Expressions such as "THIS SIZE" and "THIS MUCH" correspond to the "Size". Demonstrative adverbs such as "HERE" and "THERE" correspond to the "Position". Each of the word attributes is endowed with the No. peculiar thereto (as indicated at numeral 195).

Referring now to FIG. 22, an array S in the main storage 2 is reset to zero (step S301), and the syntax check program 1500 is started (S302). Subsequently, the matching between the feature vector obtained before and the acoustic standard pattern data 16 is performed by, for example, a method stated in Kitahara et al.: "Study on Colloquial sentence accepting method in Information retrieval system based on Voice inputs" (3-5-7, 1991, The Japan Institute of Acoustics), with the result that the input voices are transformed into a character string (S303). In the foregoing example, the character string obtained on the basis of the input voices becomes "ENLARGE THIS ABOUT THIS SIZE" ("SCALE UP THIS TO ABOUT THIS SIZE" or "SCALE UP THIS ABOUT THIS MUCH"). Further, the character string is subjected to a morphemic analysis by a conventional method (S304). As a result, morphemic information such as "ENLARGE" (verb phrase), "THIS" (pronoun, object name) and "THIS SIZE" (adverb phrase, size) are obtained.

Figure 23:
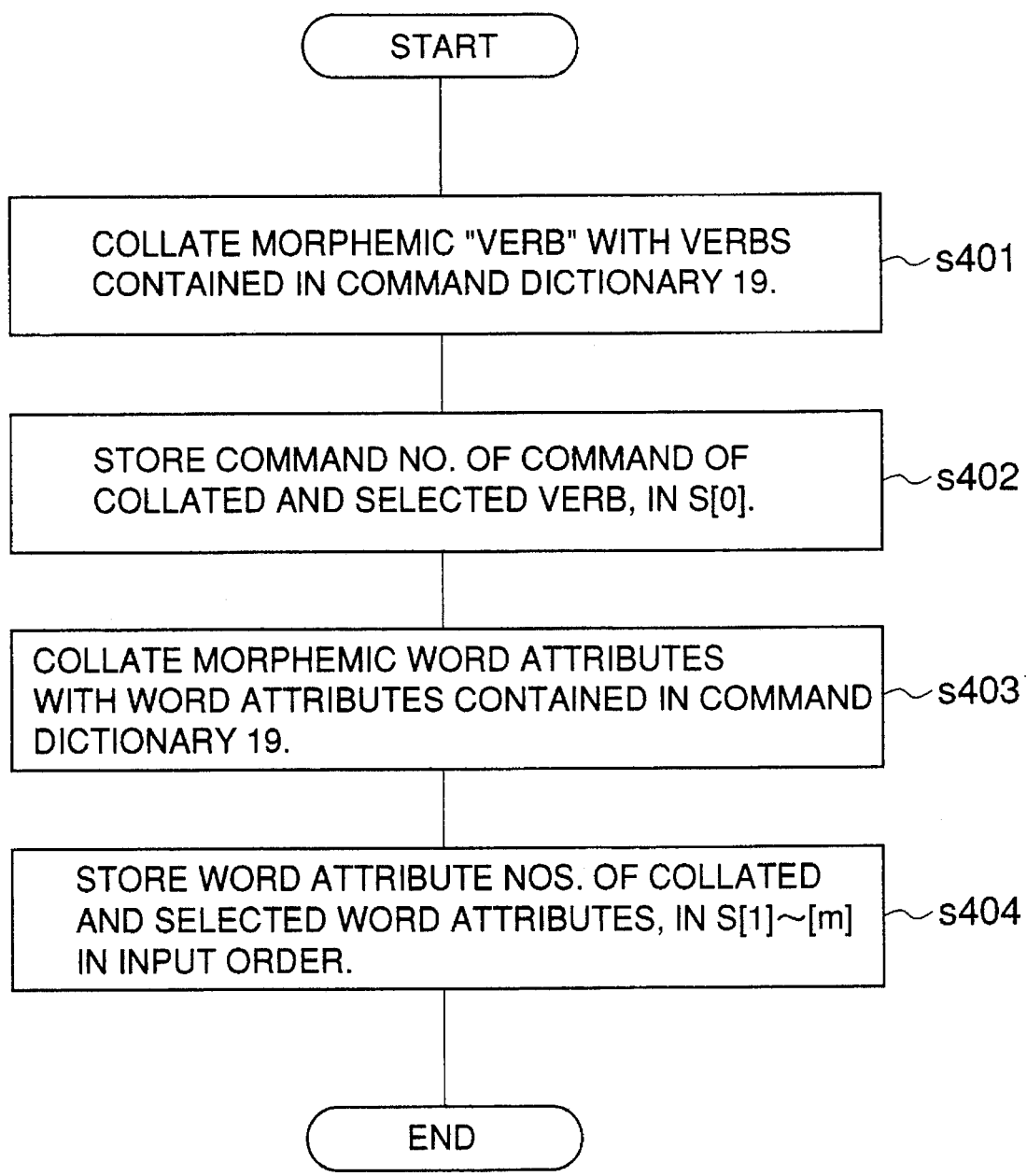
FIG. 23 is a flow chart showing an example of the flow of processing after the start of a command extraction program (1502)

At the next step, the command extraction program 1502, the processing of which is exemplified in FIG. 23, is started (S305). The verb column 191 in the command dictionary 19 explained before is referred to, and the verb phrase "ENLARGE" of the morphemic information is collated therewith (S401 in FIG. 23), whereby "ENLARGE" 1911 (in the verb column 191 in FIG. 19) is selected. As a result, command No. "1" (indicated at numeral 1941 in the command No. column 193) corresponding to the command content "ENLARGE" (indicated in the command column 192) is stored in the array S held in the main storage 2, in the form of S[0]=1 (S306, S402). Besides, the word attributes of the morphemic information are respectively collated with the word attribute column 194 of the command dictionary 19, thereby deriving the word attribute Nos. thereof from the word attribute No. column 195 (S403). In the example here, the word attributes "Object name" and "Size" are selected, and the respectively corresponding word attribute Nos. "11" and "12" are stored in the array elements S[1]–S[m] of the array S (where "m" denotes the number of word attributes) in the order in which they are selected, in the forms of S[1]=11 and S[2]=12 (S306, S404). Subsequently, the content of the command is identified in the light of the command No. stored in the array element S[0]. In the example here, "ENLARGE" is identified. Further, the array element S[1] is first checked in accordance with the word attribute No. input order of the array elements S[1]–S [m], and it is decided as indicating the word attribute No "11", namely, the word attribute "Object name" (S307). Accordingly, the object extraction program 1501 is activated or started for the first pointing gesture shown in FIG. 5 (S308).

Figure 24:
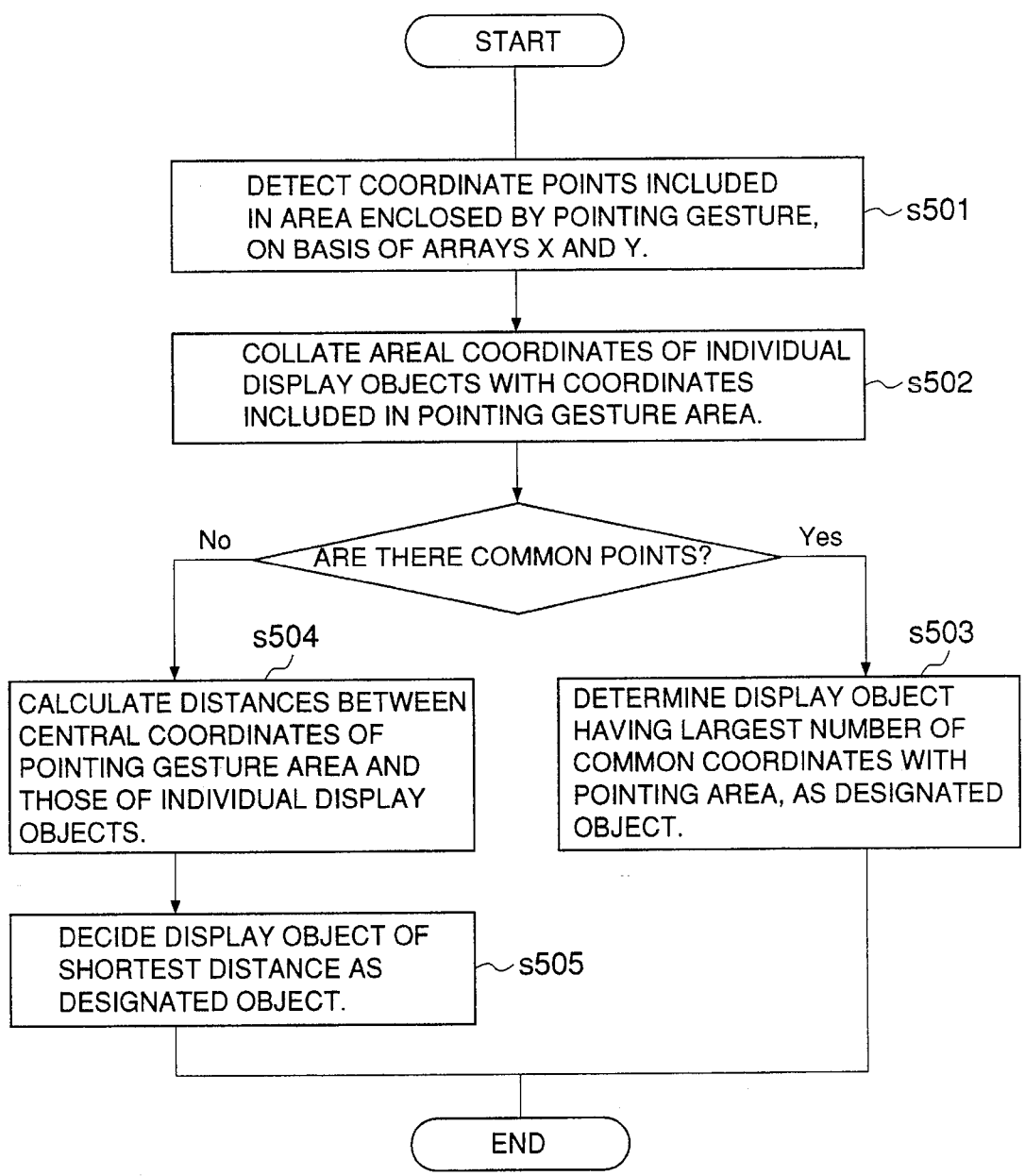
FIG. 24 is a flow chart showing an example of the flow of processing after the start of an object extraction program (1501)

The object extraction program 1501 shown in FIG. 24 calculates the minimum value XMn0 and maximum value XMx0 within X coordinate values stored in the elements X[1]–X[Z(1)] of an array X in the main storage 2 and also the minimum value YMn0 and maximum value YMx0 within Y coordinate values stored in the elements Y[1]–Y[Z(1)] of an array Y, and it calculates all coordinate values expressed as (Xq, Yq) within a range defined by $XMn0 \leq Xq \leq XMx0$ and $YMn0 \leq Yq \leq YMx0$ (S501). Incidentally, symbols 1–Z(1) correspond to the string of coordinate Nos. of the first gesture. Besides, as to each of the part Nos. 1–W stored in the drawing table 4000, the program 1501 calculates the minimum X value XMn, maximum X value XMx, minimum Y value YMn and maximum Y value YMx of each screen display object from the central coordinates and scale-up/down ratios of the drawing table 4000 and the bit map data 18, and it calculates all coordinate values expressed as (Xz, Yz) within a range defined by $XMn \leq Xz \leq XMx$ and $YMn \leq Yz \leq YMx$. Further, the program 1501 collates all the coordinate values of the individual screen display objects as represented by (Xq, Yq), with all the coordinate values represented by (Xz, Yz) (S502). The numbers of coordinate points having agreed in the collation are respectively stored in the elements COM[1]–COM[W] of an array COM in the main storage 2. Herein, if the element COM[j] of the array COM has the maximum value among the elements COM[1]–COM[W] thereof, the jth display object is decided as the designated subject to-be-handled (S503). On the other hand, in a case where no coordinates have agreed in the collation, the display object which has central coordinates nearest coordinates (Xnt, Ynt) indicated by the mean value of the X values XMn0 and XMx0 and the mean value of the Y values YMn0 and YMx0 is decided as the designated subject (S309, S504, S505). In the example of the pointing area table 204 shown in FIG. 8, the distance or length Ln1÷233 between the central coordinates (350, 330) of the "car B" and the coordinates (Xnt, Ynt)=(550, 450) at the coordinate Nos. "1"–"4" corresponding to the first pointing gesture shown in FIG. 5 is smaller than the distance Ln2÷447 between the central coordinates (300, 80) of the "rectangle C" and the coordinates (Xnt, Ynt)=(550, 450) (that is, $Ln1 \leq Ln2$ holds). Therefore, the "car B" is decided as the designated subject.

Figure 25:
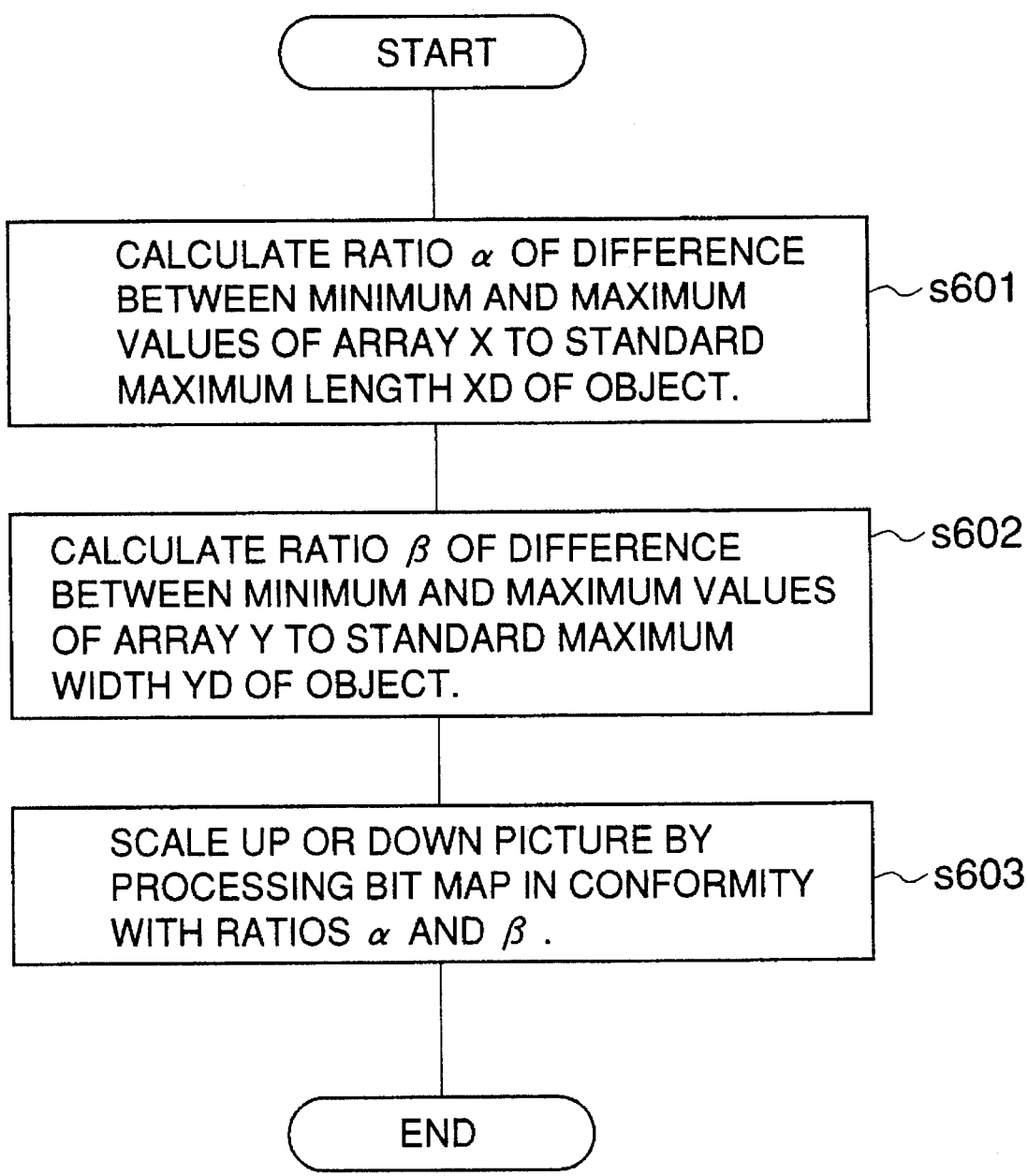
FIG. 25 is a flow chart showing an example of the flow of processing after the start of a scale-up/down ratio calculation program (1503)

Subsequently, since the array element S[2] indicates the word attribute No. "12", namely, the word attribute "Size" (step S321 in FIG. 22), the scale-up/down ratio calculation program 1503 is started for the second pointing gesture shown in FIG. 6 (S310). By the way, the step S321 may well decide whether the command content is "Scale-up" or "Movement", not the word attribute S[2]. As shown in FIG. 25, the scale-up/down ratio calculation program 1503 calculates the ratio α of the difference value (XMx1–XMn1) between the minimum value XMn1 and maximum value XMx1 within the X coordinate values stored in the elements X[Z(1)+1]–X[Z(2)] of the array X in the main storage 2, relative to the standard maximum length XD of the designated subject, and the ratio β of the difference value (YMx1–YMn1) between the minimum value YMn1 and maximum value YMx1 within the Y coordinate values stored in the elements Y[Z(1)+1]–Y[Z(2)] of the array Y in the main storage 2, relative to the standard maximum width YD of the designated subject (steps S601 and S602 in FIG. 25, and step S311 in FIG. 22). Incidentally, symbols Z(1)+1–Z(2) correspond to the string of coordinate Nos. based on the second gesture.

Figure 11:
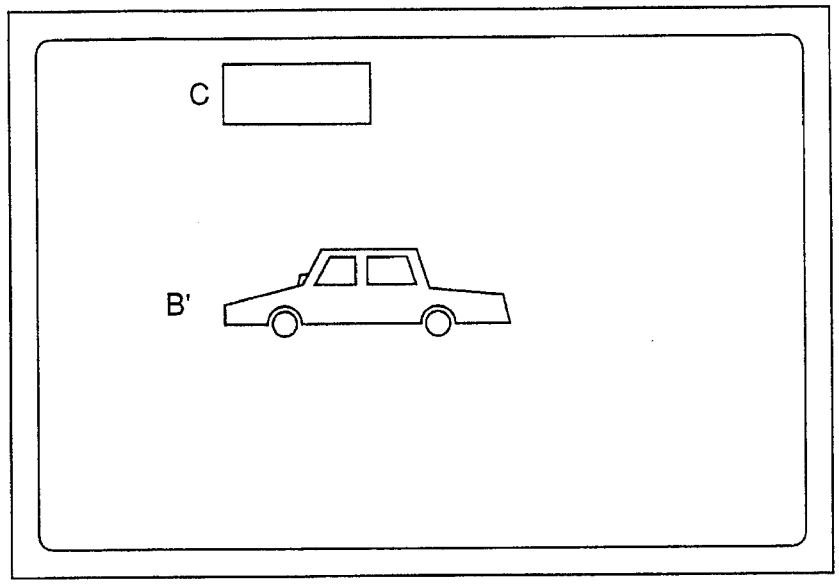
FIG. 11 is a view showing an example of an illustration editing picture frame which has been redisplayed by the designation of the subject scale-up.

Referring back to FIG. 22, the cells of the bit map are interpolated or thinned out in conformity with the calculated ratios α=2.0 and β=2.0, to thereby scale the picture up or down (to enlarge or reduce the size of the picture) (S312). This step S312 corresponds to a step S603 in FIG. 25. On this occasion, both the scale-up/down ratios may well be set at either the lengthwise scale-up/down ratio α or the widthwise scale-up/down ratio β. It is also possible that the scale-up/down ratios are fixed to the value α or β, thereby rendering the picture similar to the standard form of the part illustration. As a result, the drawing table 4000 is rewritten as shown in FIG. 10 (S313), and the illustration edit program 12 re-displays an editing picture frame as shown in FIG. 11 (S314).

Figure 12:
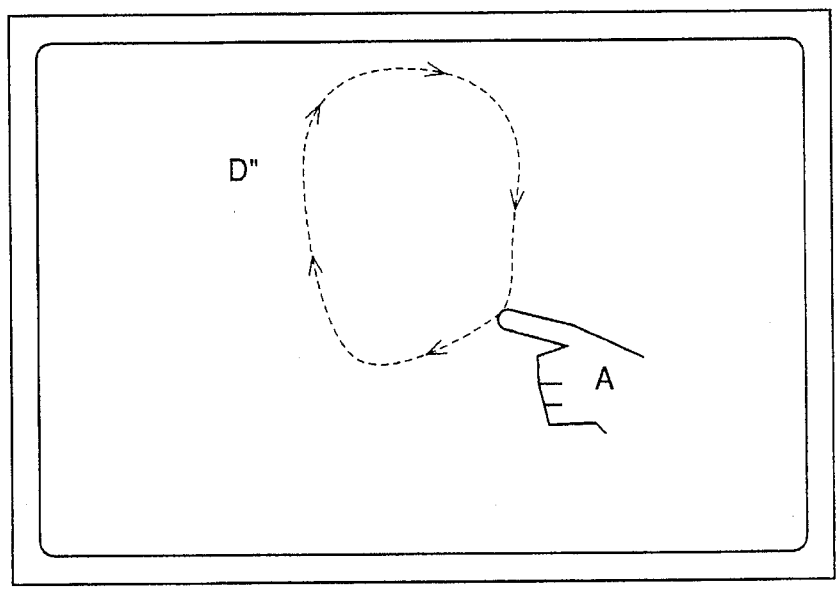
FIG. 12 is a view showing an embodiment in which a new input is designated by a voice and a pointing gesture on an illustration editing picture frame.

In the case of entering a new input, as shown in FIG. 12 by way of example, the user gives commands "DRAW A BUILDING ABOUT THIS SIZE" through voice commands and gestures. The voice commands are received through the microphone 8 (step S101 in FIG. 20). When the user designates a display position and a size by drawing a curve D" on the touch panel 5 with a finger tip, a pen or the like, the acoustic recognition program 13 loaded in the main storage 2 is started to convert the voices into a digital signal and to send the digital signal to the main storage 2 (S102), and the feature extraction program 1301 is started to extract a feature vector from the digital signal (S103), in the same manner as in the foregoing case of the operation command "Scale-up".

Meanwhile, the pointing area read program 14 loaded in the main storage 2 is started by the information processor 1 at the same time that the acoustic recognition program 13 is started by the above method. Thus, the processing of the program 14 proceeds concurrently. At this time, variables P0 and Q which are set in the buffer area W of the main storage 2 are reset to zeros (steps S201 and S202 in FIG. 21), respectively. While the user is in contact with the touch panel 5 with, e. g., the finger tip or the pen (S203), the pointing area read program 14 accepts touched coordinates through the panel controller 3 at fixed time intervals (S204). The program 14 increments the variable P0 each time it accepts the coordinates, and it writes the accepted x-coordinate into an array X[P0] in the pointing area table 204 (FIG. 8) of the main storage 2, the accepted y-coordinate into an array Y[P0], and the input time of the coordinates into an array T[P0] (S205). When a certain predetermined time period To has lapsed since the release of the finger tip, the pen or the like from the touch panel 5, the program 14 terminates the writing operation (S203). After the termination of the writing operation, in order to decide which of a display object, an input position or a size or target point the entered coordinates designate, the program t4 checks if the difference value $(T_{[i+1]}-T_{[i]})$ of the input times of the adjoining individual coordinate Nos., for example, coordinate No. i and coordinate No. (i+1) stored in the pointing area table 204 is equal to or greater than a certain predetermined value $T_g$ (S206). When this condition is encountered anywhere, the program 14 increments the variable Q and writes the coordinate No. i into an array Z in the main storage 2 (in the form of $Z[Q]=T_{[i]}$ (S207). Such steps are iterated until the value i becomes greater than the value P0 (S208).

Figures 14, 15:
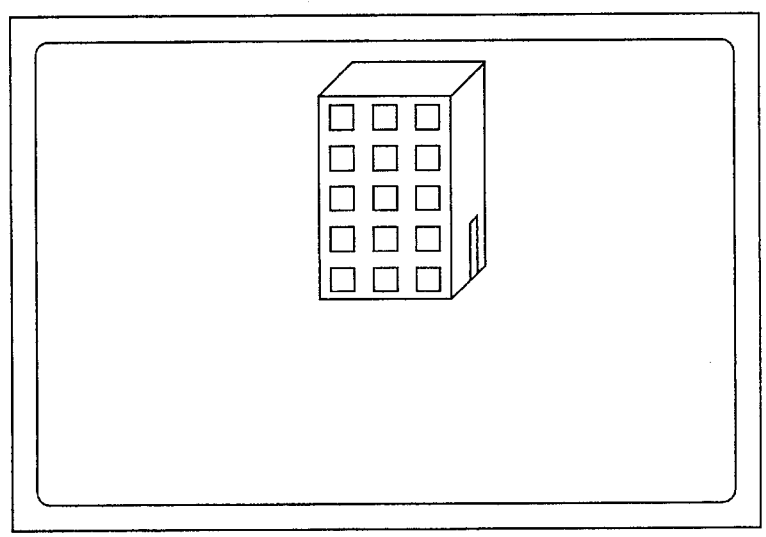
FIG. 14 is a diagram showing an example of a drawing table which has been created by the designation of the new input.
FIG. 15 is a view showing an example of an illustration editing picture frame which has been redisplayed by the designation of the new input.
Figure 26:
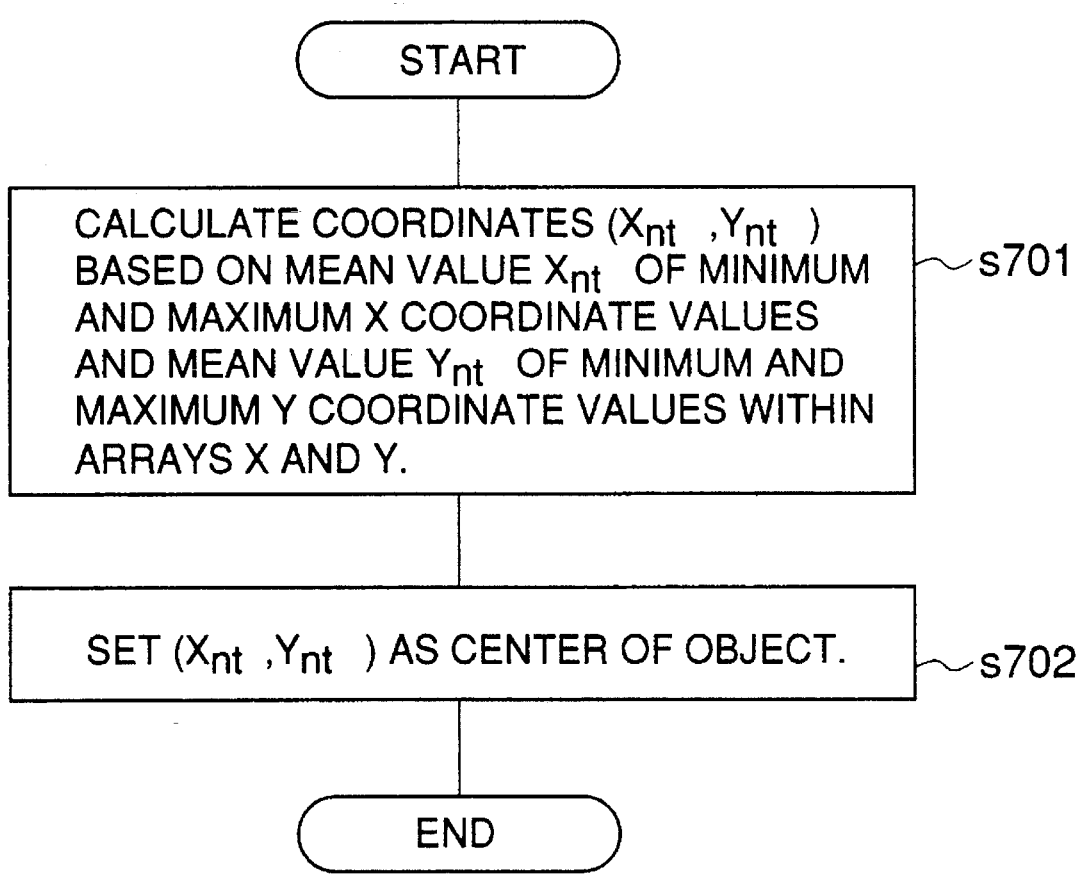
FIG. 26 is a flow chart showing an example of the flow of processing after the start of a target point calculation program (1504).

When the user's pointing and vocalization have ended, the information integration program 15 loaded in the main storage 2 is started. An array S in the main storage 2 is reset to zero (step S301 in FIG. 22), and the syntax check program 1500 is started (S302). Subsequently, in the same manner as in the case of the operation command "Scale-up", the matching between the feature vector obtained and the acoustic standard pattern data 16 is performed, with the result that the input voices are transformed into a character string (S303). Further, the character string is subjected to a morphemic analysis by the conventional method (S304), with the result that morphemic information such as "DRAW" (verb), "BUILDING" (pronoun, object name) and "THIS SIZE" (adverb phrase, size) are obtained. At the next step, the command extraction program 1502 is started (S305). The verb column 191 in the command dictionary 19 shown in FIG. 19 is referred to, and the verb "DRAW" of the morphemic information is collated therewith. As a result, the verb "DRAW" 1913 (in the verb column 191) is selected, and command No. "3" (indicated at numeral 1943 in the command No. column 193) is stored in the array S held in the main storage 2, in the form of S[0]=3 (S306). Thus, a new input mode is established. Besides, the illustration parts dictionary 17 as shown in FIG. 13 is referred to. In this regard, any word (contained in the column of part names in the dictionary 17) other than standard words (contained in the column of standard part name) is changed into the existent standard word corresponding thereto. In the example mentioned here, the word "BUILDING" is the standard word and need not be changed. In due course, the part No. 5 ("BUILDING") of the bit map data 18 corresponding to the part No. of the illustration parts dictionary 17 is selected as the new input object (step S315 in FIG. 22). In this case, it is also possible to install, for example, an illustration parts dictionary with which a word is retrieved on the basis of close words or expressions by a conceptual meaning network, as stated in Fujisawa: "Media Space for Systemization of Conceptual Knowledge" (Computer Science, 2, 1, 1992). Subsequently, the scale-up/down ratio calculation program 1503 is started (S316). This program 1503 calculates the ratio α of the difference value (XMx0–XMn0) between the minimum value XMn0 and maximum value XMx0 within the X coordinate values stored in the elements X[1]–X[Z(1)] of the array X in the main storage 2, relative to the standard maximum length XMD5 of the designated subject, and the ratio β of the difference value (YMx0–YMn0) between the minimum value YMn0 and maximum value YMx0 within the Y coordinate values stored in the elements Y[1]–Y[Z(1)] of the array Y in the main storage 2, relative to the standard maximum width YMD5 of the designated subject. In addition, the target point calculation program 1504, the processing of which is exemplified in FIG. 26, is started (step S317 in FIG. 22). This program 1504 calculates coordinates (Xnt, Ynt) based on the mean value Xnt of the X values XMn0 and XMx0 and the mean value Ynt of the Y values YMn0 and YMx0 (step S701 in FIG. 26), and it sets the coordinates (Xnt, Ynt) as the central point of the illustration part (S702). These steps S701 and S702 correspond to a step S320 in FIG. 22. Subsequently, the cells of the bit map are interpolated or thinned out in conformity with the calculated ratios α=2.2 and β=2.0, thereby scaling the picture up or down (to enlarge or reduce the size of the picture) (S312). On this occasion, both the scale-up/down ratios may well be set at either the lengthwise scale-up/down ratio α or the widthwise scale-up/down ratio β. It is also possible that the scale-up/down ratios are fixed to the value α or β, thereby rendering the picture similar to the standard form of the part illustration. As a result, the drawing table 4000 is written as shown in FIG. 14 (S313), and an editing picture frame as shown in FIG. 15 is displayed (S314).

Figures 16, 17:
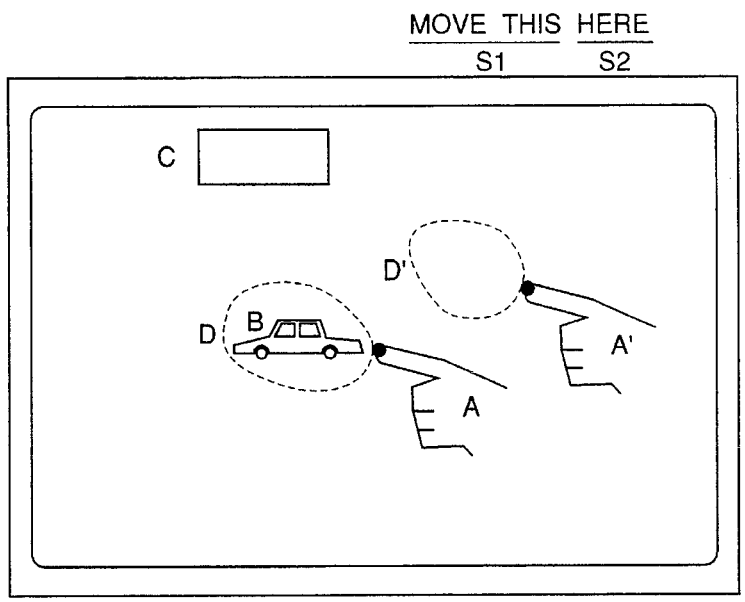
FIG. 16 is a view showing an embodiment in which the movement of a subject is designated by a voice and a pointing gesture on an illustration editing picture frame.
FIG. 17 is a diagram showing an example of the data structure of a drawing table which has been rewritten by the designation of the subject movement.

In case of moving an illustration part, as shown in FIG. 16 by way of example, the user gives commands "MOVE THIS HERE" through voices and gestures. The voices are received through the microphone 8 (step S101 in FIG. 20). When the user designates a subject to-be-handled and a target point position by drawing curves D and D' on the touch panel 5 with a finger tip, a pen or the like, the acoustic recognition program 13 is started to convert the input voices into a digital signal (S102), and a feature vector is extracted (S103), in the same manner as in the foregoing case of the operation command "Scale-up". Besides, the pointing area read program 14 is started to increment variables P0 and Q (steps S201 and S202 in FIG. 21), respectively. While the user is in contact with the touch panel 5 with, e. g., the finger tip or the pen (S203), the pointing area read program 14 accepts touched coordinates through the panel controller 3 at fixed time intervals (S204). The program 14 writes the accepted x-coordinate and y-coordinate data and the input times thereof into the pointing area table 204 (FIG. 8) of the main storage 2, at the fixed time intervals from the coordinate No. "1" in the order in which they are entered (S205). When a certain predetermined time period $T_o$ has lapsed since the release of the finger tip, the pen or the like from the touch panel 5, the program 14 terminates the writing operation (S203). After the termination of the writing operation, in the same manner as in the foregoing case of the operation command "Scale-up", the program 14 checks if the difference value $(T_{[i+1]}-T_{[i]})$ of the input times of the adjoining individual coordinate Nos., for example, coordinate No. i and coordinate No. (i+1) stored in the pointing area table 204 is equal to or greater than a certain predetermined value $T_g$ (S206). When this condition is encountered anywhere, the program 14 increments the variable Q and writes the coordinate No. i into an array Z in the main storage 2 (in the form of $Z[Q]=T_{[i]}$) (S207). Such steps are iterated until the value i becomes greater than the value P0 (S208).

When the user's pointing and vocalization have ended, the information integration program 15 loaded in the main storage 2 is started. An array S is reset to zero (step S301 in FIG. 22), and the syntax check program 1500 is started (S302). Subsequently, in the same manner as in the case of the operation command "Scale-up", the matching between the feature vector obtained and the acoustic standard pattern data 16 is performed, with the result that the input voice commands are transformed into a character string (S303). Further, the character string is subjected to a morphemic analysis by the conventional method (S304), with the result that morphemic information such as "MOVE" (verb), "THIS" (pronoun, object name) and "HERE" (adverb, position) are obtained. At the next step, the command extraction program 1502 is started (S305). The command dictionary 19 shown in FIG. 19 is referred to, and command No. "2" (indicated at numeral 1942 in the command No. column 193) corresponding to the verb "MOVE" 1912 (in the verb column 191) is stored in the array S held in the main storage 2, in the form of S[0]=2 (S306 in FIG. 22, and S401, S402 in FIG. 23). Thus, a movement mode is established. Next, word attribute Nos. "21" and "22" corresponding respectively to the extracted word attributes "Object name" and "Position" are stored in the array S in the order in which they are entered, in the forms of S[1]=21 and S[2]=22 (S307 in FIG. 22, and S403, S404 in FIG. 23). Subsequently, the object extraction program 1501 is started in the order in which the word attribute Nos. are entered (S308), and the "Car B" is decided as the designated subject to-be-handled through the same processing as in the case of the operation command "Scale-up" (S309). In addition, the target point calculation program 1504 is started (S318). This program 1504 sets coordinates $(X_{nt}, Y_{nt})$ based on the mean value $X_{nt}$ of the X values XMn1 and XMx1 and the mean value Ynt of the Y values YMn1 and YMx1, as the central point of the part illustration (S319 in FIG. 22, and S701, S702 in FIG. 26). As a result, the drawing table 4000 shown in FIG. 4 is rewritten as shown in FIG. 17 (S313), and an editing picture frame as shown in FIG. 18 is displayed (S314).

Although, in the embodiments described above, the whole illustration part is treated as one unit, the present invention is not restricted to this aspect of performance. By way of example, in the case of designating the window of a car, the subject "window of a car" can also be recognized in such a way that the user vocalizes "window" while pointing to the vicinity of the "car" as a pointing gesture. To this end, the data of the constituent elements of the part illustrations may be stored in the illustration parts dictionary 17 and the bit map data 18. Besides, in a case where a plurality of objects of the same sort (e. g., two cars) are displayed, one of the cars being a subject to-be-handled can be recognized in the same way as in the aforementioned case that the user vocalizes "car" while pointing to the pertinent "car" as a pointing gesture.

According to the present invention, a user designates a subject to-be-entered or edited by a voice command input and thus makes an edit request, while at the same time, he/she designates the subject, the display position thereof, the size thereof, etc. by pointing gestures, whereby the subject having the designated display position and the designated size can be displayed on a display screen quickly and easily. Moreover, owing to an illustration parts dictionary which stores therein necessary parts for drawing an illustration, and to a function by which a part is displayed at a designated position and with a designated size when the name of the part is given by a voice input and the display position and the size are simultaneously designated by pointing gestures, the user is freed from having to draw the part to-be-displayed through, e.g., the combination of basic patterns by himself/herself, and he/she is permitted to display the part on the display screen with ease.

What is claimed is:

1. A method of accepting multimedia operation commands wherein, while pointing to either of a display object and a display position on a display screen of a graphics display system through a pointing input device, a user commands the graphics display system to cause an event on a graphics display, through a voice input device; comprising:

a first step of allowing the user to enter a string of coordinate points which surround one area for either of the display object or any desired display position by performing a pointing gesture along the string of coordinate points;

a second step of allowing said user to give a voice command together with said pointing gesture;

a third step of recognizing a command content of said voice command by a speech recognition process in response to said voice command;

a fourth step of recognizing a command content of said pointing gesture in accordance with a recognized result of said third step; and a fifth step of executing the event on the graphics display in accordance with the command contents of said voice command and said pointing gesture.

2. A method of accepting multimedia operation commands as defined in claim 1, wherein in a case where it has been recognized on the basis of the voice command content at said third step that the entered string of coordinate points designate said display object as a designated subject to-be-handled, and where a plurality of display objects which share common areas with said area formed by said string of coordinate points are existent on the display screen, one of said display objects which has the largest common area with said area of said string of coordinate points is determined as said designated subject at said fourth step.

3. A method of accepting multimedia operation commands as defined in claim 2, wherein in a case where a plurality of display objects none of which share common areas with said area formed by said string of coordinate points are existent, one of said display objects which has a central point nearest a coordinate point which is indicated by a mean value of maximum and minimum X values of said string of coordinate points and that of maximum and minimum Y values thereof is determined as said designated subject at said fourth step.

4. A method of accepting multimedia operation commands as defined in claim 1, wherein in a case where it has been recognized on the basis of the voice command content at said third step that the entered string of coordinate points designate said display position, a coordinate point which is indicated by a mean value of maximum and minimum X values of said string of coordinate points and that of maximum and minimum Y values thereof is determined as the designated display position at said fourth step.

5. A method of accepting multimedia operation commands as defined in claim 1, wherein in a case where it has been recognized on the basis of the voice command content at said third step that the entered string of coordinate points designate a size of the specified display object on the display screen after scale-up/down of said specified display object, a ratio $\alpha$ between a difference value of minimum and maximum values within X coordinate values of said entered string of coordinate points and a standard maximum length of said display object and a ratio $\beta$ between a difference value of minimum and maximum values within Y coordinate values and a standard maximum width of said display object are calculated at said fourth step, and sizes of said display object in X and Y directions thereof are respectively determined on the basis of the calculated ratios $\alpha$ and $\beta$ at said fifth step.

6. A method of accepting multimedia operation commands as defined in claim 5, wherein only one of said ratios $\alpha$ and $\beta$ is calculated at said fourth step, and it is shared for determining said sizes of said display object in both said X and Y directions thereof at said fifth step.

7. A method of accepting multimedia operation commands as defined in claim 1, wherein in a case where it has been recognized on the basis of the voice command content at said third step that the entered string of coordinate points designate a size of a display object which is to be newly entered, a ratio $\alpha$ between a difference value of minimum and maximum values within X coordinate values of said entered string of coordinate points and a standard maximum length of said display object and a ratio $\beta$ between a difference value of minimum and maximum values within Y coordinate values and a standard maximum width of said display object are calculated at said fourth step, and sizes of said display object in X and Y directions thereof are respectively determined on the basis of the calculated ratios α and β at said fifth step.

8. A method of accepting multimedia operation commands as defined in claim 7, wherein only one of said ratios α and β is calculated at said fourth step, and it is shared for determining said sizes of said display object in both said X and Y directions thereof at said fifth step.

9. A method of accepting multimedia operation commands as defined in claim 1, wherein a plurality of strings of coordinate points are respectively entered through pointing gestures at said first step, a plurality of voice commands are respectively given together with said pointing gestures at said second step, command contents of said voice commands are respectively recognized at said third step, a time interval between input times of the respectively adjoining individual coordinate points which constitute the entered string of coordinate points is checked at said fourth step, thereby sensing a termination of one pointing gesture, and the sensed individual pointing gestures in a sequence of the sensing are respectively brought into correspondence with the individual voice command contents in a sequence of the recognition at said fifth step.

10. A method of accepting multimedia operation commands as defined in claim 1, wherein a part illustrations dictionary in which drawing data of parts required to be illustrated and names of the respective parts are stored is prepared before said first step, said user designates the input position on the display screen at said first step, and said user designates the name of any desired part in said part illustrations dictionary through said voice command at said second step, whereby said command contents of said voice command and said pointing gesture are respectively recognized at said third and fourth steps, and the designated part is displayed at the display position and with a size on said display screen as designated by said pointing gesture, at said fifth step.

11. A method of accepting multimedia operation commands as defined in claim 1, wherein the string of coordinate points specifies the size to which the display object is to be scaled.

12. A display system which is commanded by a user to cause an event concerning a display object on a graphics display, by the use of a voice command and a pointing gesture; comprising:

pointing input means for entering a string of coordinate points which surround one area for either of the display object on the graphics display and a display position of said display object;

a pointing area table which stores therein said string of coordinate points entered by said pointing input means;

bit map data memory means for storing therein bit map data of various display parts that constitute said display object, and standard maximum widths and standard maximum lengths of said display parts;

a drawing table which stores therein identifiers of said display parts selected from within said bit map data memory means and displayed on said graphics display, widthwise and lengthwise scale-up/down ratios of said display parts relative to the standard maximum widths and lengths on said graphics display, and positional information of said display parts;

a display parts dictionary which holds therein speech-recognizable names of the individual display parts stored in said bit map data memory means;

voice command input means for entering the voice command of the user;

speech recognition means for recognizing said voice command entered by salad voice command input means, with reference to said display parts dictionary;

display parts extraction means for extracting said display parts on said graphics display as designated on the basis of said string of coordinate points in said pointing area table;

target point calculation means for calculating a target point designated on the basis of said string of coordinate points in said pointing area table;

scale-up/down ratio calculation means for calculating the widthwise and lengthwise scale-up/down ratio information of said display parts on the basis of said string of coordinate points in said pointing area table; and control means for selectively activating at least one of said display parts extraction means, said target point calculation means and said scale-up/down ratio calculation means in accordance with a result of the speech recognition, and for rewriting said drawing table on the basis of a result of the activating.

13. A display system as defined in claim 12, wherein said voice command consists of a command content which expresses a sort of the event concerning said display object, and a command attribute which includes at least one of an object name, a size and said display position of said display object which are collateral with said command content; and said control means selects and activates any of said display parts extraction means, said target point calculation means and said scale-up/down ratio calculation means in accordance with said command attribute as the result of the recognition of said voice command.

14. A display system as defined in claim 12, wherein in a case where a plurality of display objects which share common areas with said area formed by said string of coordinate points exist on a display screen of said display system, said display parts extraction means determines one of said display objects which has the largest common area with said area of said string of coordinate points, as the designated subject to-be-handled.

15. A display system as defined in claim 14, wherein in a case where a plurality of display objects none of which share common areas with said area formed by said string of coordinate points exist, said display parts extraction means determines one of said display objects which has a central point nearest a coordinate point which is indicated by a mean value of maximum and minimum X values of said string of coordinate points and that of maximum and minimum Y values thereof, as said designated subject.

16. A display system as defined in claim 12, wherein said target point calculation means determines a coordinate point which is indicated by a mean value of maximum and minimum X values of said string of coordinate points and that of maximum and minimum Y values thereof, as the designated display position.

17. A display system as defined in claim 12, wherein said scale-up/down ratio calculation means calculates a ratio α between a difference value of minimum and maximum values within X coordinate values of the entered string of coordinate points and a standard maximum length of said display object and a ratio β between a difference value of minimum and maximum values within Y coordinate values and a standard maximum width of said display object, and it determines sizes of said display object in X and Y directions thereof on the basis of the calculated ratios α and β, respectively.

18. A display system which is commanded by a user to cause an event concerning a display object on a graphics display, by the use of a voice command and a pointing gesture; comprising:

pointing input means for entering a string of coordinate points which surround an area on the graphics display;

voice command input means for entering the voice command of the user;

speech recognition means for recognizing said voice command entered by said voice command input means;

execution means for executing the event on the graphics display in accordance with the string of coordinate points entered by the pointing input means and the voice command entered by the voice command input means; and wherein a plurality of display objects share common areas with said area represented by the string of coordinate points, one of the display objects which has the largest common area with the area represented by the string of coordinate points is selected as the display object.

* * * * *